United States Patent
Dortschy et al.

(10) Patent No.: US 8,320,480 B2
(45) Date of Patent: Nov. 27, 2012

(54) METHOD FOR BIT-LOADING IN A MULTI-TONE DSL SYSTEM

(75) Inventors: Boris Dortschy, Hägersten (SE); Rafael Ferrari, Valinhos (BR); Renato Lopes, Campinas (BR); Murilo Bellezoni Loiola, Jundiai (BR); Ricardo Suyama, Vinhedo (BR); Danilo Zanatta Filho, Campinas (BR); João Marco Travassos Romano, Campinas (BR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 700 days.

(21) Appl. No.: 12/442,798

(22) PCT Filed: Sep. 4, 2006

(86) PCT No.: PCT/SE2006/050309
§ 371 (c)(1),
(2), (4) Date: Oct. 28, 2009

(87) PCT Pub. No.: WO2008/030150
PCT Pub. Date: Mar. 13, 2008

(65) Prior Publication Data
US 2010/0034245 A1   Feb. 11, 2010

(51) Int. Cl.
*H04L 27/28* (2006.01)
(52) U.S. Cl. ........ 375/260; 375/259; 375/316; 375/346; 375/345; 375/219; 375/220; 375/222
(58) Field of Classification Search .................. 375/260, 375/259, 316, 346, 345, 219, 220, 222
See application file for complete search history.

(56) References Cited

U.S. PATENT DOCUMENTS

| | | | | |
|---|---|---|---|---|
| 6,134,274 A * | 10/2000 | Sankaranarayanan et al. | ........................ | 375/295 |
| 6,393,052 B2 * | 5/2002 | Sadjadpour et al. | .......... | 375/222 |
| 6,690,736 B1 * | 2/2004 | Andre | .......................... | 375/260 |
| 7,593,426 B1 * | 9/2009 | Lee et al. | ...................... | 370/468 |
| 7,609,757 B2 * | 10/2009 | Jones | ............................ | 375/220 |
| 2002/0044597 A1 * | 4/2002 | Shively et al. | ................ | 375/222 |
| 2002/0140991 A1 * | 10/2002 | Li et al. | ..................... | 358/426.13 |
| 2006/0280237 A1 * | 12/2006 | Rhee et al. | ..................... | 375/222 |
| 2008/0219290 A1 * | 9/2008 | Cioffi et al. | ................... | 370/465 |

OTHER PUBLICATIONS

Lee, J et al: "Multiuser bit loading for 1-20 multcarrier systems", Communications, IEEE Transactions on, vol. 54, pp. 1170-1174, Jul. 2006. See sections I-III, Equations 2-3, abstract.

Lee, J. et al: "Multi-user discrete bit-loading for 1-20 DMT-based DSL systems", Global Telecommunications Conference, 2002. GLOBECOM '02. IEEE, vol. 2, pp. 1259-1263, Nov. 2002. See sections I-III. abstract.

Akujuobi. C. M. et al: "A new parallel greedy bit-loading algorithm with fairness for multiple users in a DMT system". Communications. IEEE Transactions on. vol. 54. pp. 1374-1380. Aug. 2006. See sections I-III. abstract.

(Continued)

*Primary Examiner* — Kenneth Lam

(57) ABSTRACT

A method and processor in a multi-tone based multi-line transmission system such as a digital subscriber line system. The system includes a pre-processor, also referred to as a pre-coder. The processor iteratively determines an integer number of bits to be allocated before pre-processing. The determination is subject to transmit power constraints taking into account power changes on all lines due to the pre-processor and a required bit error rate.

16 Claims, 6 Drawing Sheets

OTHER PUBLICATIONS

Lee. J. et al: "A multi-user rate and power control algorithm for VDSL". Global Telecommunications Conference. 2002. GLOBECOM '02. IEEE. vol. 2. pp. 1264-1268. See sections I-III. abstract, Nov. 2002.

Lin. D. V.: "On optimal bit loading for multitone ADSL". Circuits and Systems. 2000. Proceedings. ISCAS 2000 Geneva. The 2000 IEEE International Symposium on. vol. 4. pp. 597-600. See sections 1-2. abstract, May 2000.

Sonalkar. R. V. et al: "An efficient bit-loading algorithm for DMT applications". Communications Letters. IEEE. vol. 4, pp. 80-82. Mar. 2000. See sections I-III. Abstract.

Cendrillon. R. et al: "The linear zero-forcing crosstalk canceler is near-optimal in DSL channels". Global Telecommunications Conference. 2004. GLOBECOM '04. IEEE. vol. 4. pp. 2334-2338. 2004. See sections I-III. abstract, Dec. 2004.

Zanatta Filho. D. et al: "Bit loading for precoded DSL systems". IEEE. ICASSP 2007. See sections 1-4. abstract, Apr. 2007.

* cited by examiner

METHOD FOR BIT-LOADING IN A MULTI-TONE DSL SYSTEM

TECHNICAL FIELD

The present invention relates to a multi-tone transmission-based communication system such as a Digital Subscriber Line (DSL) system. In particular, it relates to methods and arrangements for discrete bit allocation for pre-processed Discrete Multi-Tone (DMT) based systems.

BACKGROUND

Multi-tone transmission based communication systems such as Digital Subscriber Line (DSL) systems are widely used as a last-mile solution to provide broadband access to end users. In these systems, data is transmitted through the copper pairs traditionally used only for telephony. By using the existing infrastructure to provide broadband access, DSL systems are an attractive and cost-effective solution to last-mile access. Examples of DSL technologies (sometimes called xDSL) include High Data Rate Digital Subscriber Line (HDSL), Asymmetric Digital Subscriber Line (ADSL), and Very-high-bit-rate Digital Subscriber Line (VDSL).

A standard DSL line consists of a twisted wire copper-pair, which are deployed together in a cable, called binder. This binder typically origins from a Central Office (CO) and is split off into smaller portions towards the opposite end. The proximity of the pairs results in electromagnetic coupling, so that signals from one line interfere with the others. This impairment is known as crosstalk, and is one of the main factors limiting the achievable data rates in DSL systems. However, the popularity of services like video streams, which require high bit rates, is constantly driving the service providers to offer increased data rates. To provide these rates, methods that deal with crosstalk are needed.

One powerful crosstalk mitigating technique for downstream transmission is known as pre-processing or pre-coding. In the downstream, the signals in most of the pairs in a binder originate from the same central office (CO). Thus, a pre-processor, also referred to as pre-coder, may jointly process the signals from the corresponding lines prior to transmission in the CO. One simple and effective pre-processor employs linear processing. In this case, the signal transmitted in a given line after the pre-processor is actually a linear combination of the signals from all the lines. By choosing an appropriate linear combination, i.e. an appropriate pre-processor, the crosstalk can be greatly reduced.

Another important aspect of high-performance DMT-based DSL systems is bit-loading, i.e. determining how many bits each line should transmit in each tone. The challenge here is to maximize the number of bits while observing several, usually conflicting, constraints. On the one hand, a certain performance requirement, often expressed in terms of bit error rate (BER), i.e. a target BER, must be guaranteed. If the bit rate is increased, a higher transmit power is required in order to fulfil the target BER. On the other hand, the power that can be used in each copper pair is limited by practical considerations, such as the limited dynamic range of the power amplifiers and the impact of the signal on other lines or services as well as restrictions due to legislation. A good bit allocation algorithm is crucial for achieving high bit rates under the power constraints imposed by the system.

A pre-processed DSL system with a per-line power constraint is shown in FIG. 1. FIG. 1 shows a source coupled to a Central Office (CO). The CO is typically the connection point between an underlying network and a network connected user. It hosts a multiple of CO-modems concentrated in DSLAMs (DSL-Access-Multiplexer). CO-modems are connected to user-modems, often referred to as Customer-Premises-Equipment (CPE). In conventional systems, each DSL connection (line) defined by one CO-modem, a CPE and a connecting line between both, is driven independently of each other.

The CO is only provided as one example. It is also possible is to use so-called cabinets, which is a remote unit in the field hosting a multiple of DSLAMs to for instance reduce the distance between the CO-modem and the CPE, i.e. the line length, and is fed by a CO Both, CO and cabinet build practically a convergence entity for a multitude of DSL-connections.

As with all DMT-based systems, the transmission is divided into several tones, which do not interfere with one another. I.e. one tone uses a predetermined frequency range. With further reference to FIG. 1, the CO comprises for each tone one modulator per line. Before generating the actual channel input the connections that usually are driven independently, but affecting each other, may be processed in a coordinated manner, referred to as pre-processing in order to reduce crosstalk which is described above. The modulated information signal from the l-th line at the k-th tone, $\tilde{x}_l^k$, goes through the pre-processor $P_k$ before generating the actual channel input at the k-th tone in the l-th line of the binder, $x_l^k$.

A per-line power constraint is illustrated in FIG. 1, where it can be seen that the sum of the powers of all the signals transmitted in the different tones of the same line must be less than a predetermined maximal power $P_{max}$. In this specification it is assumed that the information signals from different users are uncorrelated.

As stated above, one of the main features of DSL systems is the use of DMT modulation, which essentially divides the channel seen by a user into several parallel channels, called subchannel or tones, and which are modelled as additive-white Gaussian noise (AWGN) channels. The k-th tone of the l-th line is then characterized by its complex gain, $h_{k,l}$, and its noise variance, $\sigma_{k,l}^2$. The problem of bit allocation, also referred to as bit-loading, is then to determine how many bits each line should transmit in each tone while ensuring that the system conforms to the given per-line power constraints and at the same time fulfils given requirements like maximum bit error rate. A major difficulty is that, due to the pre-coding, the power transmitted on a given line actually depends on the power allocated to all the lines. In other words, allocating a bit to a given line at a given tone actually increases the power transmitted on all lines at that particular tone.

Several bit allocation algorithms have been proposed in the literature. Most of them are based on the gap approximation, as disclosed in G. D. Forney and G. Ungerboeck, "Modulation and coding for linear Gaussian channels," *IEEE Trans. Inform. Theory*, vol. 44, pp. 2384-2415, October 1998. The gap approximation stems from the following observation. Consider the signal-to-noise ratio (SNR) needed to transmit an M-QAM constellation with a given BER on an additive-white Gaussian noise (AWGN) channel. Also consider the minimum SNR required, according to established Information Theory, to transmit $\log_2(M)$ bits on the same AWGN channel. The observation leading to the gap approximation is that the difference between these two values in dB, simply called the gap $\Gamma$, is constant, regardless of M. Using the gap approximation, it is possible to write the number of bits that can be transmitted on an AWGN channel using a QAM constellation as $$b = \log_2\left(1 + \frac{SNR}{\Gamma}\right). \tag{1}$$

The equation (1) makes it possible to determine the energy needed to transmit a certain number of bits with a given BER. Further, let the SNR of a given channel be given by $$SNR = \epsilon_{k,l} \rho_{k,l}, \qquad (1)$$

where $\epsilon_{k,l}$ is the transmitted energy on tone k and line l, and $\rho_{k,l}$ is defined as $$\rho_{k,l} = \frac{|h_{k,l}|^2}{\sigma_{k,l}^2}.$$

Then, if it is desired to transmit $b_{k,l}$ bits in the k-th tone of the l-th line with a given BER, the necessary energy is given by $$\varepsilon_{k,l} = \frac{\Gamma}{\rho_{k,l}}[2^{b_{k,l}} - 1]. \qquad (3)$$

Note that using an error-correcting coding scheme typically decreases the gap. The amount of reduction depends on the particular code used. An ideal code would decrease the gap to 0 dB, so that the number of bits in this case would coincide with the maximum theoretical rate given by information theory. On the other hand, it may be desirable to increase the gap to introduce some safety margin, thus increasing the system robustness against non-stationary noise.

Most of the existing bit-loading algorithms are only applicable to a single-user system, for which the well-known Campello's algorithm e.g. described in J. Campello, "Practical Bit Loading for DMT" Proc. IEEE International Conference on Communications, pp. 801-805, June 1999, provides an optimal bit allocation. Campello's algorithm is based on the idea of incremental allocation. Initially, zero bits are allocated to each tone. Then, at each iteration, the algorithm uses equation (3) to compute the incremental energy needed to transmit one more bit on the k-th tone. This incremental energy is defined as the difference between the energy currently allocated to the k-th tone and the energy that would need to be allocated to this tone if it were to transmit one more bit. The algorithm then allocates the bit to the tone requiring the least incremental energy. The iterations then repeat, with the algorithm allocating bits one at a time until a power constraint is violated.

It should be noted that Campello's algorithm ignores the presence of other lines, and the resulting crosstalk is just considered as ordinary background noise. In a multi-user DSL environment bit allocation becomes more involved, since in this case both background noise and crosstalk adversely affect the received signal. Assuming that no crosstalk mitigating algorithms are used, the SNR in equation (1) must be replaced by a signal-to-interference-plus-noise ratio (SINR), since in this case crosstalk is also treated as noise.

Obviously, the SINR of a given line depends on the power of the remaining lines. Thus, if a bit is allocated to a given line, the power in the corresponding line must be increased, which decreases the SINR on the other lines. If this decrease is not compensated for, the BER on the other lines will increase. In other words, the problem of bit allocation in the multi-user case is coupled between the lines, because the bits cannot be allocated to a line with no consideration to the others. In this case the optimum solution is unknown, and sub-optimal algorithms have been proposed in the literature.

One such algorithm, based on Campello's algorithm, is presented by Lee, Sonalkar and Cioffi in L. Lee, R. V. Sonalkar and J. M. Cioffi, "Multi-user discrete bitloading for DMT-based DSL systems" in Proc. IEEE Global Telecommunications Conference, vol. 2, pp. 1259-1263, November 2002. The method allocates one bit to the line and tone where the addition of said one bit requires the least increment in the total transmit power. To compute the energy increase required by the allocation of a bit, consider a given bit allocation $\{b_{k,l}\}$. From equation (3), the SINR required to convey $b_{k,l}$ bits through the k-th tone of the l-th line is expressed by $$\gamma(b_{k,l}) = \Gamma(2^{b_{k,l}} - 2). \qquad (4)$$

Let $H_k$ represent the channel matrix associated with the k-tone, and $[H_k]_{m,n}$ its (m,n)-th element. Defining $$y_k = \left[ \frac{\gamma(b_{k,1})\sigma_{1,k}^2}{[H_2]_{1,1}^2} \cdots \frac{\gamma(b_{k,N_l})\sigma_{N_l,k}^2}{[H_k]_{N_l,N_l}^2} \right]^T, \qquad (6)$$

$$[A_k]_{i,j} = \begin{cases} \dfrac{\gamma(b_{k,i})[H_k]_{i,j}^2}{[H_k]_{i,i}^2}, & \text{for } i \neq j \\ 0, & \text{for } i = j \end{cases},$$

it was shown in the above-mentioned article that the power on the k-th tone of each line required to attain the target SINR expressed by equation (4) is given by $$\epsilon_k = (I - A_k)^{-1} y_k, \qquad (7)$$

where $\epsilon_k = [\epsilon_{k,l} \ldots \epsilon_{k,N_l}]^T$. Now, starting with this configuration, if one additional bit is allocated to a particular line in tone k, the power distribution among the lines will change to $\hat{\epsilon}_k = [\hat{\epsilon}_{k,l} \ldots \hat{\epsilon}_{k,N_l}]^T$. Lee's algorithm as mentioned above will allocate the additional bit in the line for which the total power increment, defined as the difference $$\sum_j \hat{\epsilon}_{k,j} - \sum_j \epsilon_{k,j},$$

is minimized.

Another possible approach to the problem of bit allocation is to employ power allocation algorithms. After all, if the optimal power allocation is known, the number of bits can be determined using equation (1). The main difference is that, in power allocation, the fact that discrete bits will be transmitted is ignored, and it is assumed that the power in each line assumes continuous values. Thus, using power allocation algorithms along with equation (1) will produce a non-integer number of bits. This makes further processing necessary to come up with an integer solution, which may lower performance and increase complexity. Simple rounding is usually not suitable, since if the non-integer number of bits is rounded up to the closest integer number, a (power-)limitation may be violated while if the non-integer number of bits is rounded down to the closest integer number a substantial performance decrease may occur.

The most traditional power allocation method is the well-known water-filling algorithm, e.g. further described in R. Cendrillon, "Multi-user signal and spectral coordination for digital subscriber lines," Ph.D. dissertation, Katholieke Universiteit Leuven, 2004 and B. Lee, *Binder MIMO Channels*, Ph.D. thesis, Stanford University, Stanford, USA, November 2004. The water-filling algorithm assumes that the signals are jointly processed at both ends of the communication link and that the total power to be transmitted, i.e., the sum of the powers of all lines involved, is limited. To describe this algorithm, let $H_k = U_k \Sigma_k V_k^H$ be the singular-value decomposition (SVD) of the channel matrix of the k-th tone, $H_k$. Assume that a pre-coding matrix is used given by $V_k$, and that the received signal is multiplied by $U_k^H$. Now, the matrices $U_k$ and $V_k$ are unitary, so that the pre-processor does not change the total transmitted power, i.e. the sum of the powers of all lines involved, and the receiver does not change the noise statistics. Furthermore, they reduce the channel to a diagonal matrix $\Sigma_k$. In other words, there are now several independent Gaussian channels, and the optimal power allocation can be easily determined. In fact, if $\epsilon_{k,l}$ is the symbol energy associated with the k-th tone of the l-th line, then $$\varepsilon_{k,l} = \left[\gamma - \Gamma \frac{\sigma_k^2}{(\Sigma_k)_{(l,l)}^2}\right]^+,$$

where $(\Sigma_k)_{(l,l)}^2$ is where is the square of the l-th diagonal element of $\Sigma_k$, $\sigma_k^2$ is the noise variance at the k-th tone, $[x]^+ = x$ if $x > 0$, $[x]^+ = 0$ otherwise, and $\lambda$ is chosen so that the total power is equal to the maximum allowed.

One critical point of the water-filling solution is that it does not take into account any constraint on the power transmitted through each line. Indeed, although the use of a unitary pre-processing matrix incurs no increase in the total transmitted power, depending on the characteristics of the channel, the pre-processing operation may result in a substantial increase of the transmitted power in one particular line. This may lead to a violation of physical constraints imposed by the modem, for example unbalanced use of line drivers or restrictions by legislation or operators. To cope with this case, Cendrillon proposed, in the thesis "Multi-user signal and spectral coordination for digital subscriber lines" a power allocation algorithm, called optimal power allocation (OPA), for DSL systems assuming that the power on each line is constrained.

Some definitions are needed for the description of OPA. Consider the pre-processing operation $$x_k = P_k \tilde{x}_k \qquad (8)$$

where $\tilde{x}_k = [\tilde{x}_1^k \ldots \tilde{x}_{N_l}^k]^T$ is a vector containing the information symbols to be transmitted on the k-th tone of each line, $P_k$ is the pre-coding matrix for tone k and $x_k$ is a vector of pre-coded symbols to be transmitted, as shown in FIG. 1. The power of each symbol $\tilde{x}_k^n$ is denoted by $\tilde{s}_k^n$ and the power of the pre-coded symbols $x_k^n$ is denoted by $s_k^n$. For the equivalent channel $G_k = H_k P_k$, define $g_k^{l,l}$ as the square of the equivalent channel gain between the transmitted symbol $\tilde{x}_k^l$ and the received symbol $y_k^l$. Assuming that crosstalk has been eliminated through some signal processing, the number of bits that can be conveyed by the k-th tone of the l-th line is given by $$b_k^l(\tilde{s}_k^l) = \log_2\left(1 + \frac{g_k^{l,l} \tilde{s}_k^l}{\hat{\sigma}_k^2 \Gamma}\right) \qquad (9)$$

where $\sigma_k^2$ is the assumed background noise variance at tone k and $\Gamma$ is the SNR gap.

The optimal power allocation problem can be then stated as $$\tilde{s}_k^l = \arg\max_{\tilde{s}_k^l, \forall k, l} \sum_l \sum_k b_k^l(\tilde{s}_k^l) \qquad (10)$$

subject to $$\sum_k s_k^l \le P_{max}, \forall l \qquad (11)$$

$$s_k^l \ge 0, \forall l, k.$$

Notice that, considering the elements of the pre-processing matrix $[P_k]_{l,m}$ and assuming that the information symbols $\tilde{x}_k$ of each user are uncorrelated, one can write the output power for each modem as $$s_k^l \sum_m |[P_k]_{l,m}|^2 \tilde{s}_k^m. \qquad (5)$$

The values of $s_k^l$ denote the power of the signals $x_l^k \ldots x_N^k$.

The solution of the above optimization problem can be found by using Lagrange multipliers. In the thesis "Multi-user signal and spectral coordination for digital subscriber lines", Cendrillon proposes the following iterative algorithm, which computes $$\forall l, k, \tilde{s}_k^l = \left[\frac{1}{\sum_m \lambda_m |[P_k]_{l,m}|^2} - \Gamma \frac{\sigma_k^2}{g_k^l}\right]^+$$

$$\forall l, k, \lambda_l = \left[\lambda_l + \mu\left(\sum_k \sum_m |[P_k]_{l,m}|^2 \tilde{s}_k^m - P\right)\right]^+$$

until they converge.

Since OPA computes a power allocation, it may indicate that a non-integer number of bits should be transmitted through some tone. To determine an integer number of bits, the non-integer number of bits determined by OPA may be rounded down to the nearest integer value. This solution is referred to here as rounded OPA (ROPA). Note that the number of bits must be rounded down. Otherwise, the power limitation would be violated.

Thus, the problem is to achieve a method and arrangements for allocating an integer number of bits for a pre-processed multi-line DSL system. Hence, an integer number of bits to each tone of each line should be allocated, while the power on each line is limited to a specific upper power limitation while taking into account BER and other requirements and the operations of the pre-processor.

The problem with the above-described solutions is that most of them do not apply to the above mentioned problem addressed by this invention. Campello's bit-loading algorithm in "Practical Bit Loading for DMT" applies to single-line systems, while Lee's algorithm described in "Multi-user discrete bit-loading for DMT-based DSL systems" applies to multi-user (i.e. multi-line) systems with no crosstalk-mitigating processing, i.e. no pre-processing is used. The existing power allocation algorithms, such as OPA, fail to take into account the discrete nature of the transmitted bits.

SUMMARY

Therefore, the object of the present invention is to achieve an improved method and arrangement for bit-loading in a pre-processed multi-tone multi-line system.

The object is achieved by methods and arrangements that makes it possible to allocate, before the pre-processing is performed, an integer number of bits to a given line at a given tone such that the total power at the channel needed to transmit these allocated bits is minimized. It should be noted that the total extra power is computed after the pre-processor (see equation x3), and takes into account the extra power caused by the pre-processor on all the lines.

According to a first aspect the present invention relates to a method in a multi-tone based multi-line communication system for determining an optimal number of bits to be allocated for each line and each tone subject to a predefined power constraint per line and subject to a required BER. Each line is passing through a pre-processor adapted to pre-process data carried by each line. The method comprising the steps of (a) determining a first number of total bits to be allocated for each tone and each line before processing by the pre-processor, (b) estimating the transmit power required after the pre-processing for said first number of bits subject to the required BER, (c1) reducing said first number of bits to a second number of bits for a selected tone and line if the first number of bits is too high subject to an estimated required power after processing by the pre-processor compared to the predefined power constraints, (d1) estimating the transmit power required after the pre-processing for said second number of bits subject to the required BER, and (e1) repeating steps (c1)-(d1), whereby the second number of bits is set to the first number of bits (i.e. the number of bits is reduced in each iteration), until the optimal number of bits to be allocated subject to the power constraint per line and subject to a required BER is achieved, is an improved solution for bit-loading in a pre-processed multi-line system.

According to a preferred embodiment, the tone and the line are selected such that the changing from the first number of bits to the second number of bits provides the greatest power reduction compared with if the corresponding change from the first number to the second number would have been performed on any other of the remaining lines and tones.

According to a second aspect, the present invention relates to a method in a multi-tone based multi-line communication system for determining an optimal number of bits to be allocated for each line and each tone subject to a predefined power constraint per line and subject to a required BER. Each line is passing through a pre-processor adapted to pre-process data carried by each line. The method comprising the steps of determining (a) a first number of total bits to be allocated for each tone and each line before processing by the pre-processor, estimating (b) the transmit power required after the pre-processing for said first number of bits subject to the required BER, —increasing (c2) said first number of bits to a third number of bits for a selected tone and line if the first number of bits is lower than necessary subject to an estimated required power after processing by the pre-processor compared to the predefined power requirement, estimating (d2) the transmit power required after the pre-processing for said third number of bits subject to the required BER, and repeating (e2) steps (c2)-(d2), whereby the third number of bits is set to the first number of bits (i.e. the number of bits is increased in each iteration), until the optimal number of bits to be allocated subject to a power constraint per line and subject to the required BER is achieved, is an improved solution for bit-loading in a pre-processed multi-line system.

According to a preferred embodiment, the tone and the line are selected such that the changing from the first number of bits to the third number of bits provides the smallest power increase compared with if the corresponding change from the first number to the second number would have been performed on any of the remaining lines and tones.

According to third aspect of the present invention a processor adapted for a multi-tone based multi-line communication system for determining an optimal number of bits to be allocated for each line and each tone subject to a predefined power constraint per line and subject to a required BER is provided. Each line is passing through a pre-processor adapted to pre-process data carried by each line. The processor comprising determining means adapted to determine a first number of total bits to be allocated for each tone and each line before processing by the pre-processor, an estimator adapted to estimate the transmit power required after the pre-processing for said first number of bits subject to the required BER, means for reducing said first number of bits to a second number of bits for a selected tone and line, the estimator is further adapted to estimate the transmit power required after the pre-processing for said second number of bits subject to the required BER, and a controller adapted to control repeatedly operation of the means for reducing and the estimator adapted to estimate the transmit power required after the pre-processing for said second number of bits subject to the required BER, whereby the second number of bits is set to the first number of bits (i.e. the number of bits is reduced in each iteration), until the optimal number of bits to be allocated subject to the power constraint per line and subject to a required BER is achieved, constitutes an improved processor for bit-loading in a pre-processed multi-line system.

Preferably, the processor comprises means for selecting the tone and the line such that the changing from the first number of bits to the second number of bits provides the greatest power reduction compared with if the corresponding change from the first number to the second number would have been performed on any of the remaining lines and tones.

According to a fourth aspect, the present invention relates to a processor in a multi-tone based multi-line communication system for determining an optimal number of bits to be allocated for each line and each tone subject to a predefined power constraint per line and subject to a required BER. Each line is passing through a pre-processor adapted to pre-process data carried by each line. The processor comprising a determining means adapted to determine a first number of total bits to be allocated for each tone and each line before processing by the pre-processor, an estimator adapted to estimate the transmit power required after the pre-processing for said first number of bits subject to the required BER, means for increasing said first number of bits to a third number of bits for a selected tone and line, the estimator is further adapted to estimate the transmit power required after the pre-processing for said third number of bits subject to the required BER, and a controller adapted to control repeatedly operation of the means for increasing and the estimator adapted to estimate the transmit power required after the pre-processing for said third number of bits subject to the required BER, whereby the third number of bits is set to the first number of bits (i.e. the number of bits is increased in each iteration), until the optimal number of bits to be allocated subject to a power constraint per line and subject to the required BER is achieved, constitutes an improved processor for bit-loading in a pre-processed multi-line system.

Preferably, the processor comprises means for selecting the tone and the line such that the changing from the first number of bits to the third number of bits provides the smallest power increase compared with if the corresponding change from the first number to the second number would have been performed on any of the remaining lines and tones.

An advantage with the present invention is that embodiments of the invention makes it possible to easily take into account spectral masks on per line and per tone basis, as well as a sum power limitation of the lines on a per tone basis. The latter one is reasonable especially in the case the system under consideration is a Multiple Input Multiple Output (MIMO) system.

A further advantage with the present invention is that a data rate close to that of optimal power allocation (OPA) is achieved, which is the best rate achievable by the system when the power on each line is constrained. Thus, the proposed methods achieve a performance close to optimal while observing the practical constraint of integer bit allocation and a per-line power constraint. Hence, it is well suited for practical implementation. As mentioned above the OPA ignores the fact that the number of bits in each tone is discrete, so that it may result in a non-integer bit allocation, which restricts its practical usefulness.

A further advantage is that the proposed method is an improvement compared to ROPA, which is the only other known bit-allocation method for pre-coded DMT-based xDSL systems. In fact, the proposed methods obtain rates that are 50 Mbps higher than those achieved by the ROPA in a 10-pair MIMO-VDSL system.

DETAILED DESCRIPTION

In the following description, for purposes of explanation and not limitation, specific details are set forth, such as particular sequences of steps, signaling protocols and device configurations in order to provide a thorough understanding of the present invention. It will be apparent to one skilled in the art that the present invention may be practiced in other embodiments that depart from these specific details.

Moreover, those skilled in the art will appreciate that the functions explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

Figure 1:
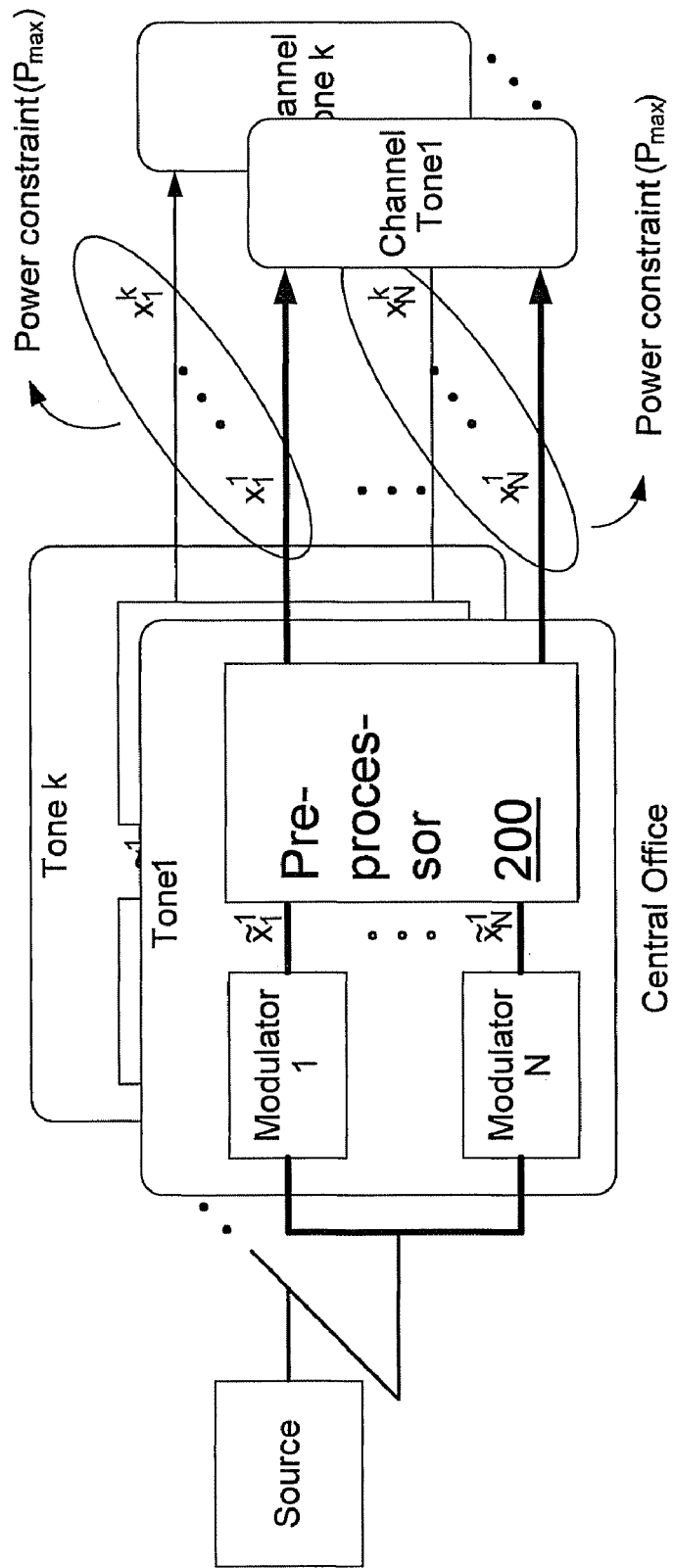
FIG. 1 shows a pre-coded multi-tone transmission based multi-user system wherein the present invention can be implemented.
Figure 2:
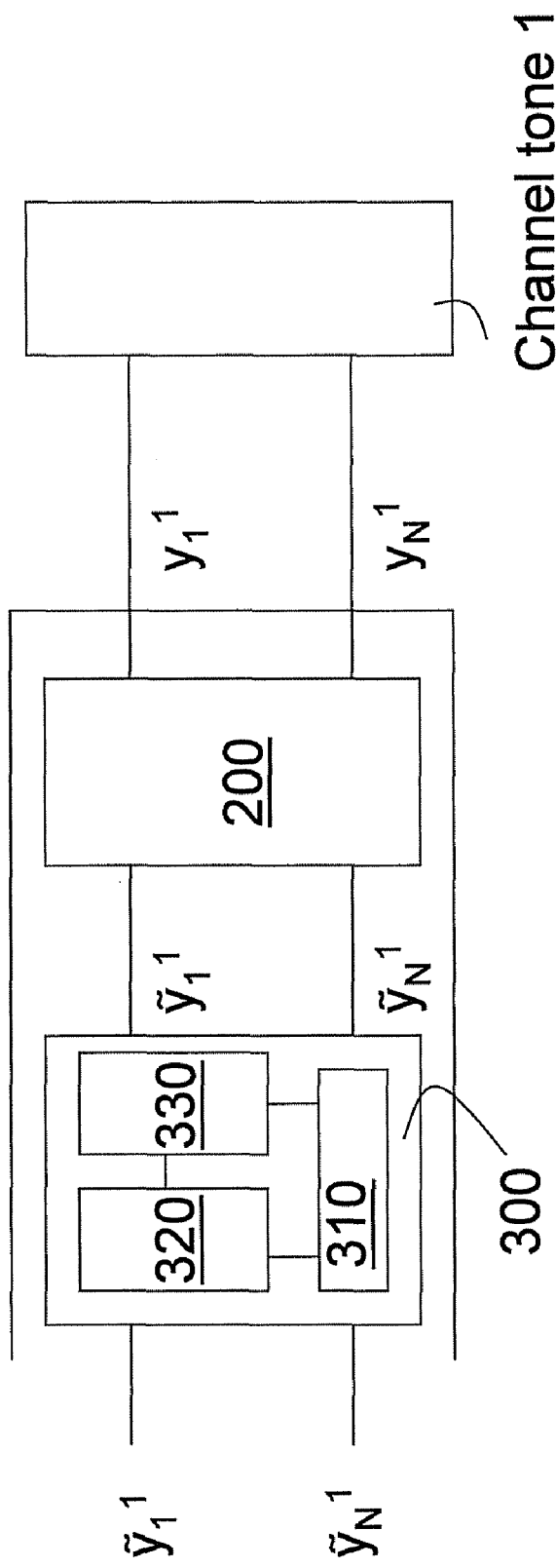
FIG. 2 shows the processor according to the present invention when implemented in the system of FIG. 1.

The present invention will now be described with reference to FIG. 2, wherein a processor 300 according to the present invention is implemented in a pre-processed (i.e. pre-coded) multi-tone multi-line system with a per-line power constraint and other constraints such as e.g. BER which is described in conjunction with FIG. 1. The processor 300 is located such that the processing of the processor is performed before the pre-processor 200.

The basic idea of the present invention is to iteratively determine an integer number of bits to be allocated before the pre-processing subject to transmit power constraints taking into account power changes on all lines due to the pre-processor and a required BER.

The iterative determination may be done by starting with zero bits and then at each iteration allocate an additional bit to a given line at a given tone, whereby the given line and tone preferably is selected such that they carry the added bit with the least power increase while observing the target BER and the power constraints. The target BER may be accounted for by using the gap approximation as described above. This iterative determination is referred to as bit-filling.

Further, the iterative determination may also be performed by starting with a pre-defined maximum number of bits on all lines and tones and then in each iteration to remove a bit from a given line at a given tone, whereby the given line and tone preferably is selected such that this bit removal results in the largest power decrease until all BER and power constraints are met. This iterative determination is referred to as bit-removal.

Accordingly, the processor of present invention is adapted to be employed in a CO or any similar place. The processor is hence adapted to determine an optimal number of bits to be allocated for each line and each tone subject to a predefined power constraint per line taking into account a required BER, wherein each line is passing through the CO. The CO comprises further a pre-processor adapted to pre-process data carried by each line passing through the CO. The processor comprises determining means 320 for determining a first number of total bits to be allocated for each tone and each line before processing by the pre-processor, an estimator 330 adapted to estimate the transmit power required after the pre-processing for said first number of bits subject to a required BER resulting after the pre-processing for said first number of bits.

According to a first alternative, the processor comprises the further means 320 for reducing said first number of bits to a second number of bits for a selected tone and line if the first number of bits is too high subject to an estimated required power after processing by the pre-processor 200 compared to the predefined power constraints, the estimator 330 is further adapted to estimate the transmit power required after the pre-processing for said second number of bits subject to a required BER resulting after the pre-processing for said second number of bits, and a controller 310 for repeatedly operate the means for reducing, the estimator, such that the number of bits is reduced in each iteration, until the optimal number of bits to be allocated, subject to a power constraint per line taking into account a required BER, is achieved.

According to a second alternative, the processor 300 comprises means 320 for increasing said first number of bits to a third number of bits for a selected tone and line if the first number of bits is too low subject to an estimated BER and power after processing by the pre-processor 200 compared to the predefined requirements, the estimator is in this alternative embodiment adapted to estimate the transmit power required after the pre-processing for said third number of bits subject to a required BER resulting after the pre-processing for said third number of bits, and a controller 310 for repeatedly operate the means for increasing 320, the estimator 330, such that the number of bits is increased in each iteration, until the optimal number of bits to be allocated, subject to a power constraint per line and subject taking into account a required BER, is achieved.

It should be noted that the optimal of bits implies the maximum number of bits that requires a transmit power after the operation of the pre-processor that is less or equal to a pre-defined power constraint whereby a BER requirement is taken into account One of the crucial steps of the bit allocation according to the present invention is the comparison of the costs of allocating a bit to a given line and tone. In the single-line case, this cost is a scalar, namely the power increase required by this bit allocation. However, in the pre-processed system according to the present invention, when a bit is allocated to a tone and a line, this actually represents an increase in the power transmitted on that particular tone in every copper pair involved. Thus, the vectors of power increase must be compared. Since it is not possible to sort vectors, it is in the present invention proposed to compare the total power increase required by a bit allocation to a given tone, i.e., the sum of the power increases on that particular tone in all the pairs involved.

The first alternative embodiment uses the concept of bit removal. In this case, a predetermined number of bits are set as a starting value, preferably the maximum number of bits that are supported by the system. Since in general several bits will be transmitted on each tone, the initialization with a large number of bits is closer to the optimal bit allocation than the initialization with no bits, which yields faster convergence. In other words, instead of allocating a bit to the line and tone that requires the least extra power, a bit from the line and tone that yields the greatest power reduction is removed.

To describe the methods of the present invention the following symbols are used:
i Tone index
j Line index
$h_{i,j}$ Complex channel gain, representing the amplitude and phase distortion (direct channel) of the i-th tone of the j-th line.
$\sigma_{i,j}^2$ Noise variance (i-th tone, j-th line)
$\rho_{i,j}$ Normalized pre-coded tone signal-to-noise ratio (i-th tone, j-th line) assuming unit transmit power and defined as:

$$\rho_{i,j} = \frac{|h_{i,j}|^2}{\sigma_{i,j}^2} \quad (x1)$$

Γ SNR gap
$b_{i,j}$ Number of bits conveyed by the i-th tone of the j-th line
B Matrix containing the bit allocation solution, i.e., $B_{(i,j)} = b_{i,j}$
$\epsilon_{i,j}$ Symbol energy associated with the i-th tone of the j-th line (before pre-coder matrix) defined, based on the gap approximation, as:

$$\varepsilon_{i,j} = \frac{\Gamma}{\rho_{i,j}}[2^{b_{i,j}} - 1] \quad (x2)$$

$N_{tones}$ Total number of tones per line
$N_{lines}$ Total number of lines
$M_i$ Pre-coder matrix associated with the i-th tone ($N_{lines} \times N_{lines}$)
$p_{i,j}$ Transmitted energy associated with the i-th tone of the j-th line (after pre-coder matrix) computed as:

$$p_{i,j} = \sum_{k=1}^{N_l} |[M_i]_{j,k}|^2 \times \varepsilon_{j,k} \quad (x3)$$

$P_j^{max}$ Maximum power allowed in the j-th line
The problem is then to maximize the total number of bits, $$\sum_{i=1}^{N_{tones}} \sum_{j=1}^{N_{lines}} b_{i,j},$$

subject to a power constraint per line, i.e., $$\sum_{i=1}^{N_{tones}} p_{i,j} \leq P_j^{max} \text{ for } 1 \leq j \leq N_{lines}.$$

In order to obtain the optimal number of bits, i.e. the maximum number of bits that requires a transmit power after the operation of the pre-processor that is less or equal to a pre-defined power constraint whereby a BER requirement is taken into account, the steps below may be performed in the bit-removal method.

1. Define a maximum number of bits (max_bits) to be assigned to each one of the tones
2. Initialization:
   a. Set $b_{i,j}$=max_bits for $1 \leq i \leq N_{tones}$ and $1 \leq j \leq N_{lines}$
   b. Evaluate the symbols' energies $\epsilon_{i,j}$ using (x2), for all $1 \leq i \leq N_{tones}$ and $1 \leq j \leq N_{lines}$
   c. Calculate the transmitted power $p_{i,j}$, using (x3) for all $1 \leq i \leq N_{tones}$ and $1 \leq j \leq N_{lines}$
3. While $$\sum_{i=1}^{N_{tones}} p_{i,j} > P_j^{max}$$

for any j ($1 \leq j \leq N_{lines}$) or PSD (power spectral density) violated, i.e., while all constraints are not satisfied.
   a. For i=1 ... $N_{tones}$ and j=1 ... $N_{lines}$, evaluate $\Delta P^{(i,j)}$, the energy reduction associated to removing one bit from tone i and line j.
      i. Let $\tilde{b}_{(i,j)} = b_{(i,j)} - 1$
      ii. Evaluate the symbol energy $\tilde{\epsilon}_{i,j}$ associated with $\tilde{b}_{(i,j)}$
      iii. Evaluate the transmitted power at tone i, $\tilde{p}_{i,l}$, for $1 \leq l \leq N_{lines}$, that results from this new allocation
      iv. Compute the resulting total power reduction $$\Delta P^{(i,j)} = \sum_{l=1}^{N_{lines}} \beta_l(p_{i,l} - \tilde{p}_{i,l})$$

where $\beta_j$ is a weighting factor that penalizes power removal from lines whose current power is close to $P_{max}$ b. Find i* and j* such that
   i. If $\exists(\hat{i}, \hat{j})$ for which PSD mask constraint is violated, then $(i^*, j^*) = (\hat{i}, \hat{j})$
   ii. else $(i^*, j^*) = \arg \max \Delta P^{(i,j)}$
c. Remove one bit from the optimum position: $b_{(i^*, j^*)} = b_{(i^*, j^*)} - 1$
d. Compute $\epsilon_{i,j}$ and $p_{i,j}$ for this new bit allocation
4. End In the bit-removal method above, the parameter $\beta_j$ is a weighting factor that may play an important role through the iterations. Hence assume that at one particular iteration the power transmitted on the j-th line is close to $P_j^{max}$. Then, it may happen that the optimal bit removal is such that the power on line j is greatly decreased, which would imply that this line is transmitting far less power than it is allowed. The role of $\beta_j$ is to avoid that this happens, i.e. to penalize power removal, which results from bit removal from lines whose current power is close to $P_j^{max}$. One possible choice for $\beta_j$ is the difference between the allocated power and $P_j^{max}$.

In some practical instances, power and bit allocation algorithms must take into account the existence of power spectral masks i.e. requirements on the Power Spectral Density, which implies the limitation of power per tone and per line. These masks limit the power transmitted on each tone of each line individually, so as to constrain the power radiation at specific frequencies and to protect other services from undue interference. Incorporating the power spectral mask (see step 3 in the bit removal algorithm of table 1) into the bit removal algorithm is not straightforward. A solution according to an embodiment is to initially perform the proposed bit removal ignoring the masks, until the transmitted power in each line is less than the total available power. Then, it is possible to continue removing bits from the tones that violate the masks, until the transmitted power in all tones and lines are valid. These both steps could be combined, as shown in Table 1, step 4.b. The advantage of having separate search steps is that, in this case, the solving of PSD mask violations can be focused on tones where there really is a violation. Further, it is also possible to initialize the algorithm looking for crosstalk free bit-loading and assigning the maximum number of bits according to the PSD masks and the noise level. Note that this can generate a power surplus, which can be used by tones that are transmitting at powers well below those allowed by the mask.

In cases, where few bits will be transmitted in each tone, it is advantageous to use the above described bit-filling algorithm. In this case, the method starts by allocating zero bits to all tones and lines, and an additional bit is successively allocated to the line and tone that requires the least extra power. The resulting algorithm is shown below.

Incorporating spectral masks into the proposed bit-filling algorithm is straightforward. Assume that allocating a bit to a tone i and line j results in a transmitted power that violates the mask. Then, this allocation is not valid, and it is required to restrict the search space so as to prevent this possibility. In the Bit-filling algorithm, this is expressed abstractly in steps 3.b and 3.c. In other words, the minimization at step 3.b is performed over all tones and lines that results in a transmitted power that conforms to the spectral masks.

In order to allocate an optimal integer number of bits, i.e. the maximum number of bits that requires a transmit power after the operation of the pre-processor that is less or equal to a pre-defined power constraint whereby a BER requirement is taken into account, in a pre-processed multi-line system, the steps below may be performed according to the bit-filling method.

Figure 6B:
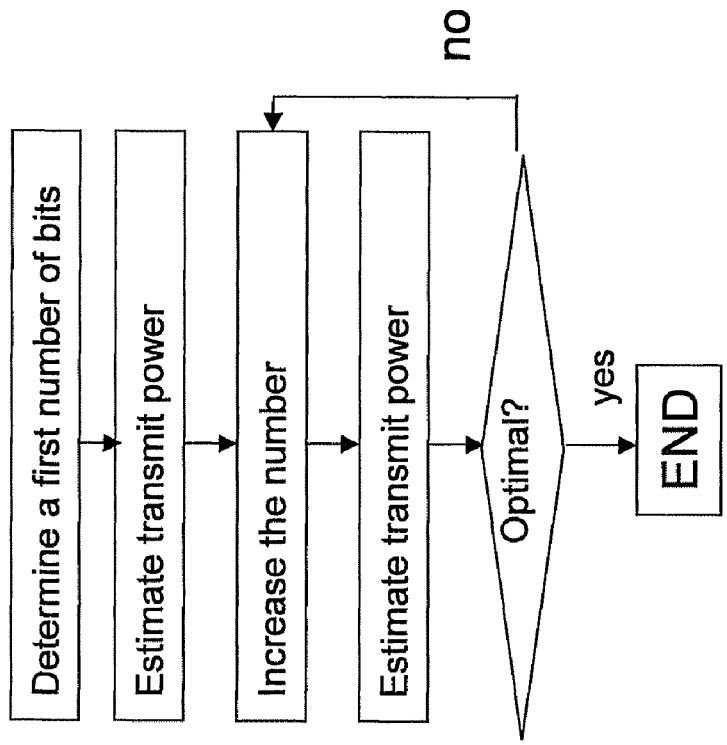
FIGS. 6a and 6b illustrates the methods according to the present invention.
Figure 6A:
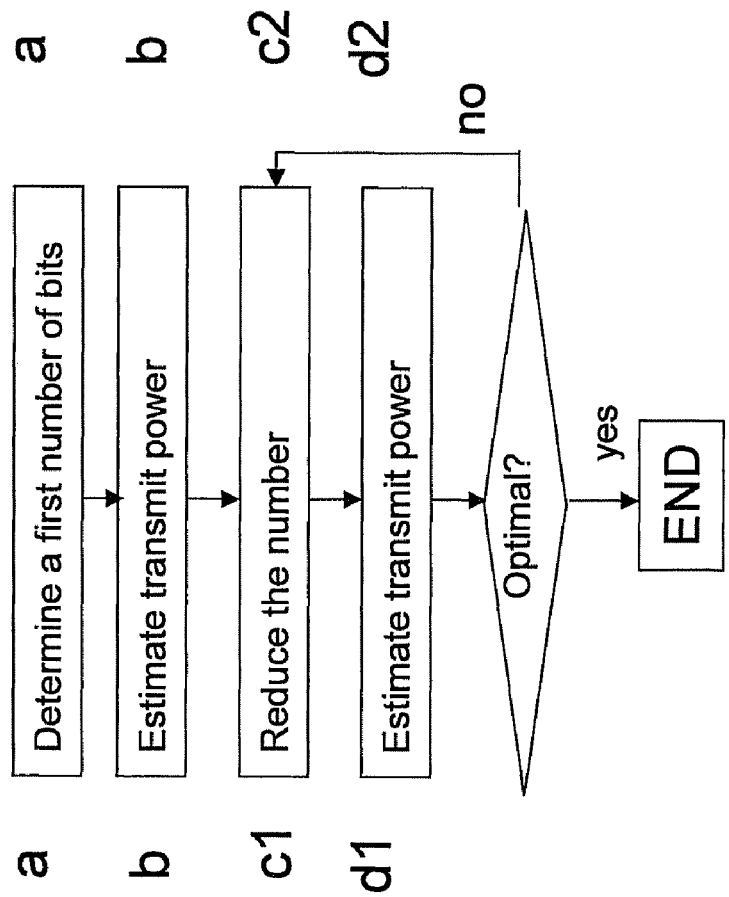

1. Initialization:
   a. Set $b_{i,j} = 0$ for all $1 \leq i \leq N_{tones}$ and $1 \leq j \leq N_{lines}$
   b. Evaluate the symbols' energies $\epsilon_{i,j}$ using (x2), for all $1 \leq i \leq N_{tones}$ and $1 \leq j \leq N_{lines}$
   c. Calculate the transmitted power $p_{i,j}$, using (x3) for all $1 \leq i \leq N_{tones}$ and $1 \leq j \leq N_{lines}$
2. STOP=false
3. While (not Stop)
   a. For $i=1 \ldots N_{tones}$ and $j=1 \ldots N_{lines}$, evaluate $\Delta P^{(i,j)}$, the energy increment associated to adding one bit to tone i and line j.
      i. Let $\tilde{b}_{(i,j)} = b_{(i,j)} + 1$
      ii. Evaluate the symbol energy $\tilde{\epsilon}_{i,j}$ associated with $\tilde{b}_{(i,j)}$
      iii. Evaluate the transmitted power at tone i, $\tilde{p}_{i,l}$, for $1 \leq l \leq N_{lines}$, that results from this new allocation
      iv. Compute the resulting total power increment $$\Delta P^{(i,j)} = \sum_{l=1}^{N_{lines}} \beta_l (\tilde{p}_{i,l} - p_{i,l})$$

where $\beta_j$ is a weighting factor that penalizes power increase in lines whose current power is close to $P_{max}$
   b. Find i* and j* such that $(i^*, j^*) = \arg \min \Delta P^{(i,j)}$ for all pairs (i,j) where the PSD mask is not violated and $$\sum_{i=1}^{N_{tones}} p_{i,j} < P_j^{max}$$

c. If $\exists (i^*, j^*)$
      a. Add one bit to the optimum position: $b_{(i^*,j^*)} = b_{(i^*,j^*)} + 1$
      b. Compute $\epsilon_{i,j}$ and $p_{i,j}$ for this new bit allocation
      d. Else STOP=True
4. End Thus the present invention relates to the bit removal method and the bit filling method as illustrated in the flowcharts of FIGS. 6a and 6b, respectively. The bit removal methods comprises the steps of:

(a) Determine a first number of total bits to be allocated for each tone and each line before processing by the pre-processor.

(b) Estimate the transmit power required after the pre-processing for said first number of bits subject to the required BER.

If the first number of bits is too high subject to an estimated required power after processing by the pre-processor compared to the predefined power constraints, the following steps are performed:

(c1) Reduce said first number of bits to a second number of bits for a selected tone and line.

(d1) Estimate the transmit power required after the pre-processing for said second number of bits subject to the required BER.

(e1) Repeat steps c1-d1, whereby the second number of bits is set to the first number of bits (i.e. the number of bits is reduced in each iteration), until the optimal number of bits to be allocated subject to the power constraint per line and subject to a required BER is achieved.

The bit filling method according to the present invention comprises the steps of:

(a) Determine a first number of total bits to be allocated for each tone and each line before processing by the pre-processor.

(b) Estimate the transmit power required after the pre-processing for said first number of bits subject to the required BER.

If the first number of bits is lower than necessary, e.g. set to zero, subject to an estimated required power after processing by the pre-processor compared to the predefined power constraints, the following steps is performed:

(c2) Increase said first number of bits to a third number of bits for a selected tone and line if the first number of bits is too low subject to an estimated required power after processing by the pre-processor compared to the predefined power requirement.

(d2) Estimate the transmit power required after the pre-processing for said third number of bits subject to the required BER.

(e2) Repeat steps c2-d2, whereby the third number of bits is set to the first number of bits (i.e. the number of bits is increased in each iteration), until the optimal number of bits to be allocated subject to a power constraint per line and subject to the required BER is achieved.

The performance of the proposed bit-removal algorithm has been evaluated through simulations, wherein the rate as a function of the reach was evaluated for a 10-pair MIMO-VDSL channel generated using the B. Lee, *Binder MIMO Channels*, Ph.D. thesis, Stanford University, Stanford, USA, November 2004 discussed above. The wire diameter is 0.5 mm (24-AWG). As per the VDSL standard, 4096 tones are used, with tone spacing $\Delta f$ equal to 4.3125 kHz and the DMT symbol rate $f_s$ equal to 4 kHz. The background noise is composed by white thermal noise with a PSD of −140 dBm/Hz and the available transmitted power for each line is +11 dBm. The computations are based on the gap approximation: the target bit error rate (BER) is $10^{-7}$ or less, the coding gain was set to 3.8 dB and the noise margin to 6 dB, which leads to a gap of $\Gamma$=9.8−3.8+6=12 dB. In all cases, zero-forcing (ZF) processing as described in R. Cendrillon, "Multi-user signal and spectral coordination for digital subscriber lines," Ph.D. dissertation, Katholieke Universiteit Leuven, 2004 and B. Lee, *Binder MIMO Channels*, Ph.D. thesis, Stanford University, Stanford, USA, November 2004 was used, and $\beta_j$=1. It is worth mentioning that both bit-removal and bit-filling achieve the same rates.

Figure 3:
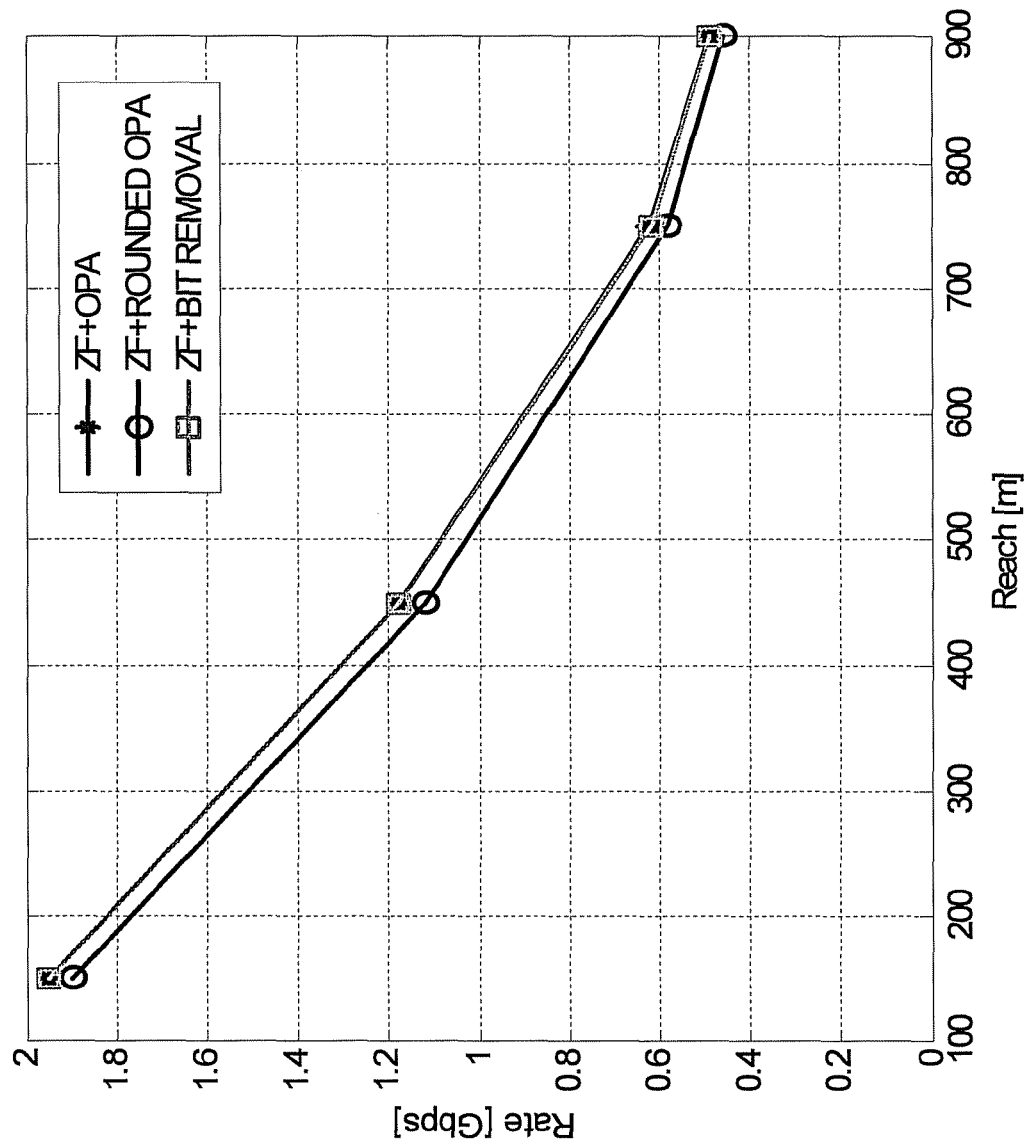
FIG. 3 illustrates the achievable downstream bitrate by OPA, ROPA and the proposed bit removal with zero-forcing pre-coding.
Figure 4:
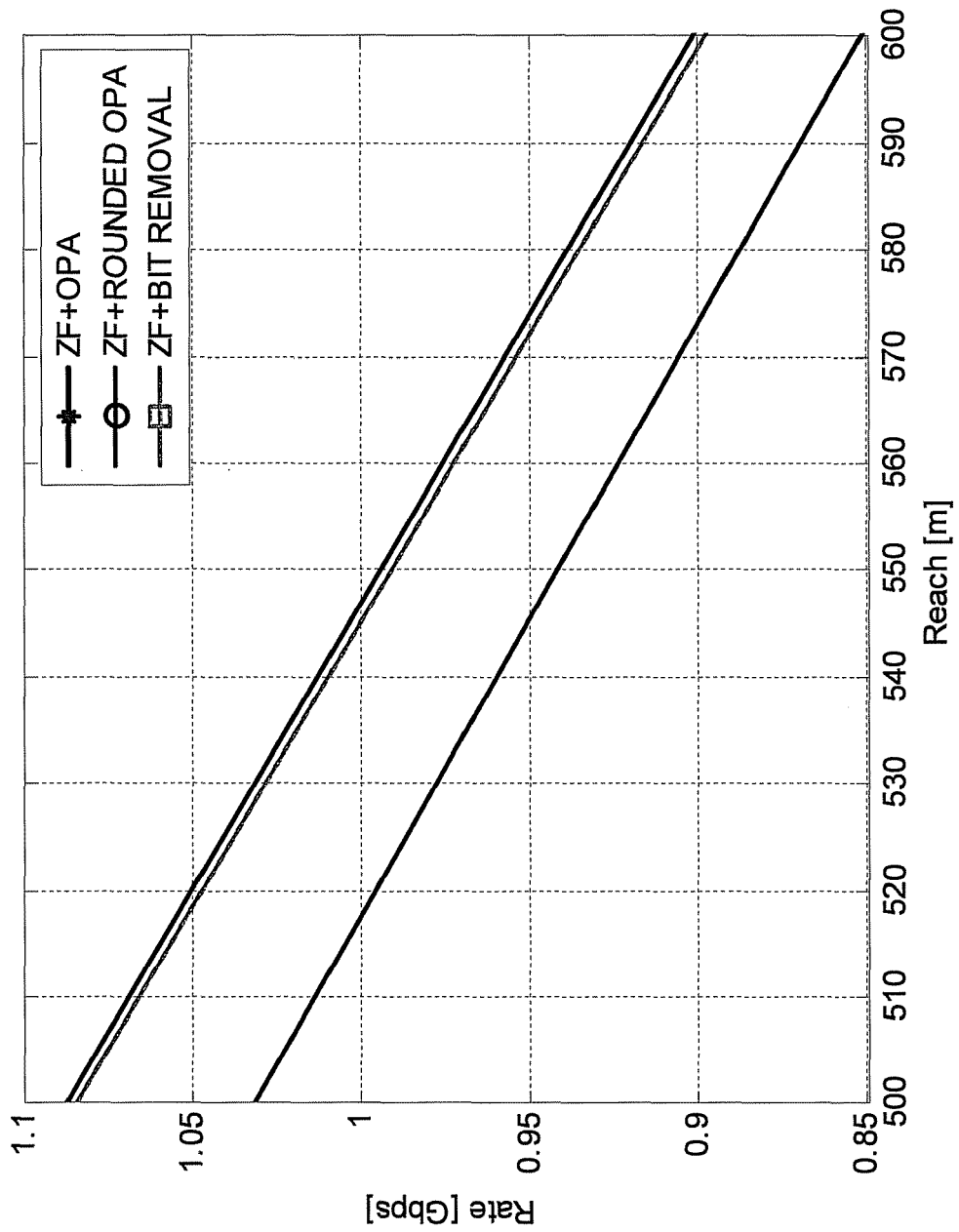
FIG. 4 illustrates the achieved bitrate between 500 m and 600 m.
Figure 5:
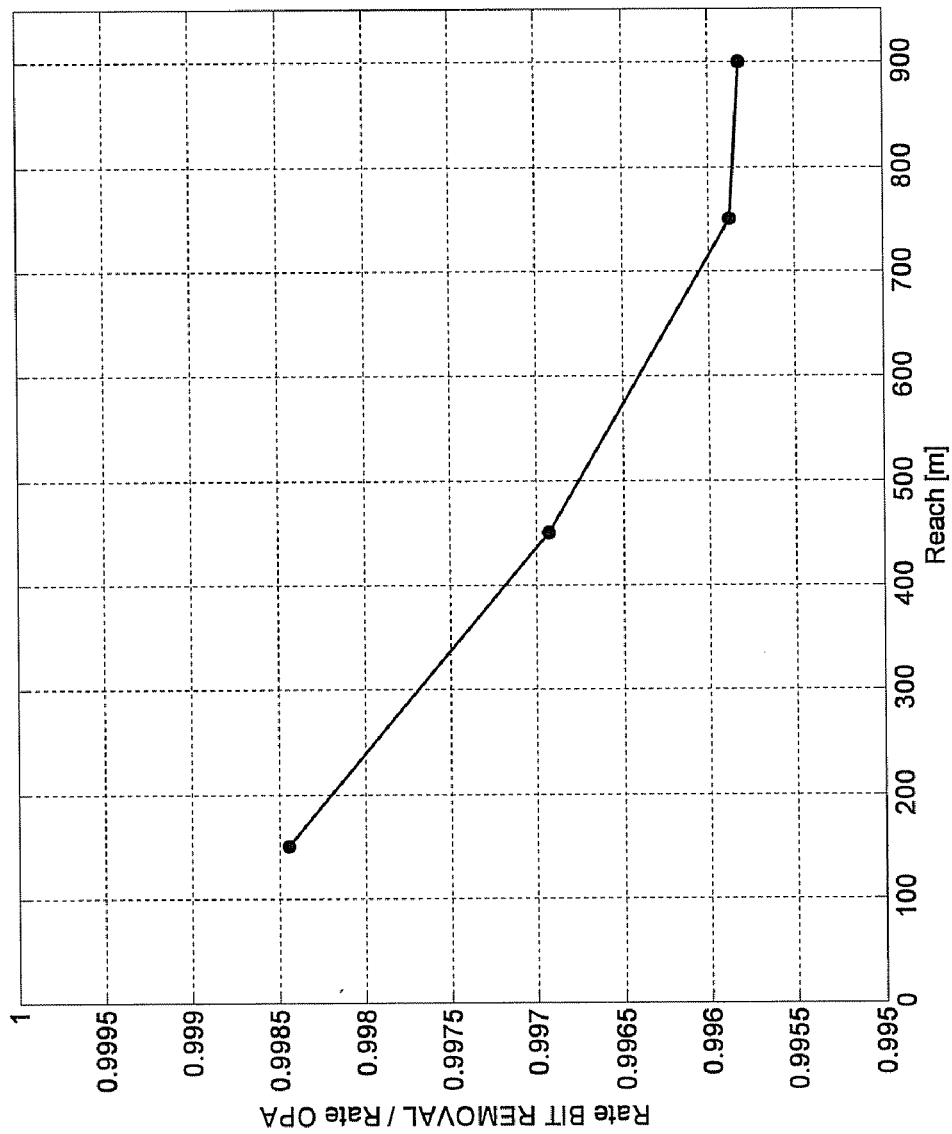
FIG. 5 illustrates the ratio of the downstream rates achieved by the proposed bit removal and OPA with zero-forcing pre-coding.

The achievable bit rate for the binder in the downstream is shown in FIG. 3, where the performance of OPA and ROPA are also shown. In FIG. 4, a detail of FIG. 3 is shown. As can be seen in these figures, the proposed algorithm outperforms rounded-OPA by around 50 Mbps, while it achieves a rate close to that of OPA. Note, however, that OPA computes power allocation, and may yield a non-integer bit allocation. To highlight the similar performance of the proposed algorithm when compared to OPA, in FIG. 5 the ratio of the rates achieved by both methods are plotted. As it can be seen, the proposed algorithm incurs a loss of at most 0.45% in the simulated scenario.

Although all presented details are explained in relation to DSL transmission systems, application is not limited to only them, but to all multi-tone transmission systems.

While the present invention has been described with respect to particular embodiments (including certain device arrangements and certain orders of steps within various methods), those skilled in the art will recognize that the present invention is not limited to the specific embodiments described and illustrated herein. Therefore, it is to be understood that this disclosure is only illustrative. Accordingly, it is intended that the invention be limited only by the scope of the claims appended hereto.

The invention claimed is:

1. A method in a multi-tone based multi-line communication system for determining an optimal number of bits to be allocated for each line and each tone subject to a predefined power constraint per line and subject to a required bit error rate (BER), wherein each line passes through a pre-processor adapted to pre-process data carried by each line, the method comprising the steps of:

(a) determining a first number of total bits to be allocated for each tone and each line before processing by the pre-processor;

(b) estimating the transmit power required after the pre-processing for the first number of bits subject to the required BER;

(c1) reducing the first number of bits to a second number of bits for a selected tone and line if the first number of bits is too high subject to an estimated required power after processing by the pre-processor compared to the predefined power constraints;

(d1) estimating the transmit power required after the pre-processing for the second number of bits subject to the required BER; and (e1) repeating steps (c1)-(d1), wherein the second number of bits is set to the first number of bits, until the optimal number of bits to be allocated subject to the power constraint per line and subject to the required BER is achieved;

wherein the tone and the line are selected such that changing from the first number of bits to the second number of bits provides the greatest power reduction compared with any reduction resulting from changing from the first number to the second number of bits on any other of the remaining lines and tones.

2. The method according to claim 1, wherein a total power reduction caused by changing from the first to the second number of bits is computed by using a weighting factor which penalizes power removal from lines whose current power is close to a maximal allowed power.

3. The method according to claim 1, wherein steps c1-d1 are repeated while ignoring any existing power spectral density mask until the estimated transmit power in each line is less than a total available power, and the method further comprises removing bits from tones that violate the existing power spectral density mask until the estimated transmit powers for all lines and all tones are valid.

4. The method according to claim 1, wherein the estimating steps include taking any existing power spectral masks into account.

5. The method according to claim 1, wherein the multi-tone based multi-line communication system is a Digital Subscriber Line system.

6. A method in a multi-tone based multi-line communication system for determining an optimal number of bits to be allocated for each line and each tone subject to a predefined power constraint per line and subject to a required bit error rate (BER), wherein each line passes through a pre-processor adapted to pre-process data carried by each line, the method comprising the steps of:

(a) determining a first number of total bits to be allocated for each tone and each line before processing by the pre-processor;

(b) estimating the transmit power required after the pre-processing for the first number of bits subject to the required BER;

(c2) increasing the first number of bits to a third number of bits for a selected tone and line if the first number of bits is lower than necessary subject to an estimated required power after processing by the pre-processor compared to the predefined power requirement;

(d2) estimating the transmit power required after the pre-processing for the third number of bits subject to the required BER; and (e2) repeating steps (c2)-(d2), wherein the third number of bits is set to the first number of bits, until the optimal number of bits to be allocated subject to a power constraint per line and subject to the required BER is achieved;

wherein the tone and the line are selected such that changing from the first number of bits to the third number of bits provides the smallest power increase compared with any increase resulting from changing from the first number to the third number of bits on any other of the remaining lines and tones.

7. The method according to claim 6, wherein a total power increase caused by changing from the first to the third number of bits is computed by using a weighting factor which penalizes power increase from lines whose current power is close to a maximal allowed power.

8. The method according to claim 6, wherein steps c2-d2 are repeated while ignoring any existing power spectral density mask until the estimated transmit power in each line is less than a total available power, and the method further comprises removing bits from tones that violate the existing power spectral density mask until the estimated transmit powers for all lines and all tones are valid.

9. A processor in a multi-tone based multi-line communication system for determining an optimal number of bits to be allocated for each line and each tone subject to a predefined power constraint per line and subject to a required bit error rate (BER), wherein each line passes through a pre-processor adapted to pre-process data carried by each line, wherein the processor comprises:

determining means for determining a first number of total bits to be allocated for each tone and each line before processing by the pre-processor;

an estimator for estimating the transmit power required after the pre-processing for the first number of bits subject to the required BER;

means for reducing the first number of bits to a second number of bits for a selected tone and line;

wherein the estimator also estimates the transmit power required after the pre-processing for the second number of bits subject to the required BER;

a controller for controlling repeated operation of the reducing means and the estimator for estimating the transmit power required after the pre-processing for the second number of bits subject to the required BER, wherein the second number of bits is set to the first number of bits, until the optimal number of bits to be allocated subject to the power constraint per line and subject to the required BER is achieved; and means for selecting the tone and the line such that changing from the first number of bits to the second number of bits provides the greatest power reduction compared with any reduction resulting from changing from the first number to the second number of bits on any other of the remaining lines and tones.

10. The processor according to claim 9, wherein the estimator includes means for computing a total power reduction caused by changing from the first to the second number of bits by using a weighting factor which penalizes power removal from lines whose current power is close to a maximal allowed power.

11. The processor according to claim 9, wherein the controller repeats steps c1-d1 while ignoring any existing power spectral density mask until the estimated transmit power in each line is less than a total available power, and the controller removes bits from tones that violate the existing power spectral density mask until the estimated transmit powers for all lines and all tones are valid.

12. A processor in a multi-tone based multi-line communication system for determining an optimal number of bits to be allocated for each line and each tone subject to a predefined power constraint per line and subject to a required bit error rate (BER), wherein each line passes through a pre-processor adapted to pre-process data carried by each line, wherein the processor comprises:

determining means for determining a first number of total bits to be allocated for each tone and each line before processing by the pre-processor;

an estimator for estimating the transmit power required after the pre-processing for the first number of bits subject to the required BER;

means for increasing the first number of bits to a third number of bits for a selected tone and line;

wherein the estimator also estimates the transmit power required after the pre-processing for the third number of bits subject to the required BER;

a controller for controlling repeated operation of the increasing means and the estimator for estimating the transmit power required after the pre-processing for the third number of bits subject to the required BER, wherein the third number of bits is set to the first number of bits, until the optimal number of bits to be allocated subject to a power constraint per line and subject to the required BER is achieved; and means for selecting the tone and the line such that changing from the first number of bits to the third number of bits provides the smallest power increase compared with any increase resulting from changing from the first number to the third number of bits on any of the remaining lines and tones.

13. The processor according to claim 12, wherein the estimator includes means for computing a total power reduction caused by changing from the first to the third number of bits by using a weighting factor which penalizes power increases from lines whose current power is close to a maximal allowed power.

14. The processor according to claim 12, wherein the controller repeats steps c2-d2 while ignoring any existing power spectral density mask until the estimated transmit power in each line is less than a total available power, and the controller removes bits from tones that violate the existing power spectral density mask until the estimated transmit powers for all lines and all tones are valid.

15. The processor according to claim 12, wherein the estimator includes means for taking any existing power spectral masks into account.

16. The processor according to claim 12, wherein the multi-tone based multi-line communication system is a Digital Subscriber Line system.

* * * * *